April 14, 1964  S. T. GUSTAVSON ETAL  3,128,771
TOBACCO PRODUCT AND METHOD FOR MAKING SAME
Original Filed Nov. 23, 1956  6 Sheets-Sheet 5

INVENTORS
STERLING T. GUSTAVSON
VICTOR G. HANSON
BY Bradley Cohn
ATTORNEY

United States Patent Office 3,128,771
Patented Apr. 14, 1964

3,128,771
TOBACCO PRODUCT AND METHOD FOR MAKING SAME
Sterling T. Gustavson, Rosedale, and Victor G. Hanson, Brooklyn, N.Y., assignors to International Cigar Machinery Company, a corporation of New Jersey
Original application Nov. 23, 1956, Ser. No. 624,067, now Patent No. 3,016,779, dated Jan. 16, 1962. Divided and this application Apr. 7, 1961, Ser. No. 108,228
9 Claims. (Cl. 131—15)

This application is a division of our application Serial No. 624,067, filed November 23, 1956 and now Patent No. 3,016,779 and claim is made to all the equitable and legal benefits derivable therefrom.

This invention relates to automatic feeds for web material on high speed cigar machines.

An object of the invention is to cut a desired shape from the leading end of a web material with a minimum of waste material.

It is also an object of the invention to provide a method and an apparatus for cutting successive leading portions from the leading end of a web with such economy with respect to waste.

It is a further object of the invention to provide a method and apparatus which can be readily varied for cigars of varying lengths and diameters without the necessity of expensive modelling parts.

It is a further object of the invention to provide an apparatus which may be readily attached to existing cigar machines to operate in place of and from the mechanisms of the cutting die turrets to deliver web portions of a continuous web of wrapper or binder material into the machine.

It is another object of the invention to utilize existing suctional control means on the machine.

Another object of the invention is to provide a method for severing suitably shaped sections from the leading end of a web with a minimum of waste. This has been accomplished by providing a web width of cigar length and cutting for cigar diameter.

It is an object of the invention to feed a web whose width is related to the length of a cigar so that parallel edges of the web may be utilized without further severance and the relative head to tuck ratio established by angulation of the transverse cutter supplemented by a small waste tab at the tuck end only.

It is an object of the invention to so feed the web that variations in the diameter of the cigar may be taken care of by mere adjustment of the increment of web feed and variations in the length of the cigar may be taken care of by selection of a suitable source of web width. Thus the novel method may be practised by feeding web across a suctional cutting table which is utilized for all shapes thus eliminating expensive model parts.

It is an object of the invention to devise a method and apparatus for more economical use of material while eliminating the need of expensive modelling parts.

It is also an object of the invention to provide a simplified transverse knife and to eliminate at least one tab cutting knife.

Other objects will become apparent in the following disclosure embodying the invention, in which.

With reference to the drawings, the tobacco web W is pulled from a roll or reel R by means of a pair of intermittently driven feed rollers 20 and 22. The operation of the machine begins with placing the leading end of web W on a suction pickup table 24. During operation the leading end is then picked up from table 24 by a reciprocating suction feed head 26 which carries it across a suction table 28 and deposits it thereon. Feed head 26 then returns to its original starting position. The suction table 28 is vertically movable and provided with a suction chamber 30. A suitably shaped knife 32 is secured to the end of table 28 adjacent suction pickup table 24. The hollow suction table 28 has an end section 34 (FIGS. 5 and 8) which is secured to the bottom plate 36 of said suction table. The hollow chamber 38 of section 34 communicates with the chamber 30 of the table 28.

Figure 1:
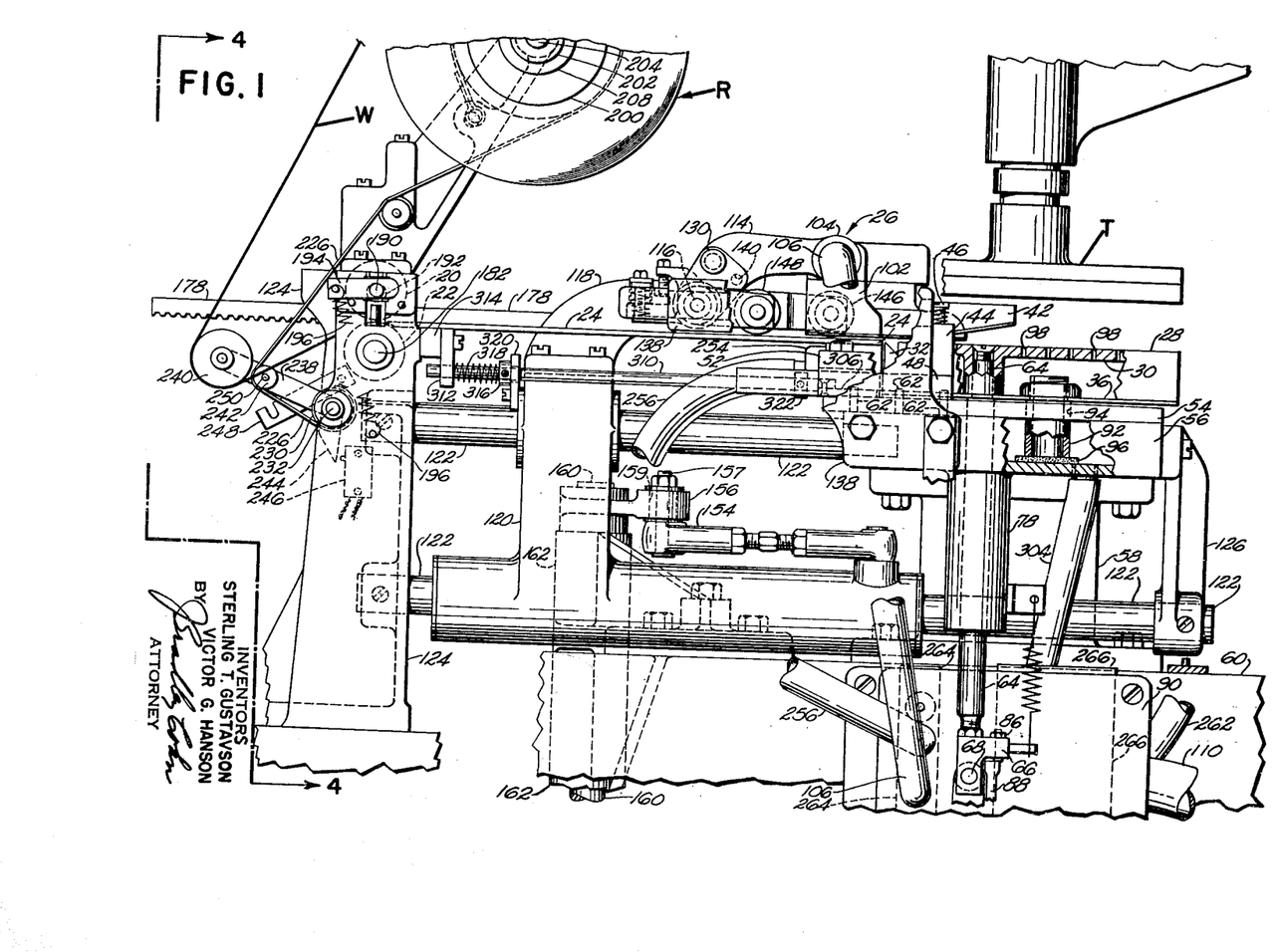
FIG. 1 is a side elevation of the binder web feeding apparatus.

To the forward edge of the hollow end section 34 is secured a ledger plate 40 (FIGS. 3, 5, 8 and 9). Ledger plate 40 coacts with the swingable spring-loaded vertical knife 42 mounted on a block 44 pivoted to a vertical stud 46 held by a horizontal bar 48 by means of a suitable set screw 50. Bar 48 by means of lug 52 is adjustably clamped to the top plate 54 of a suction chamber 56 secured to a frame bracket 58 mounted on the bed plate 60 of the cigar machine as illustrated in FIG. 1. The bar 48 is held in perfect alignment by means of a plurality of guide pins 62 projecting from the face of top plate 54.

Figure 2:
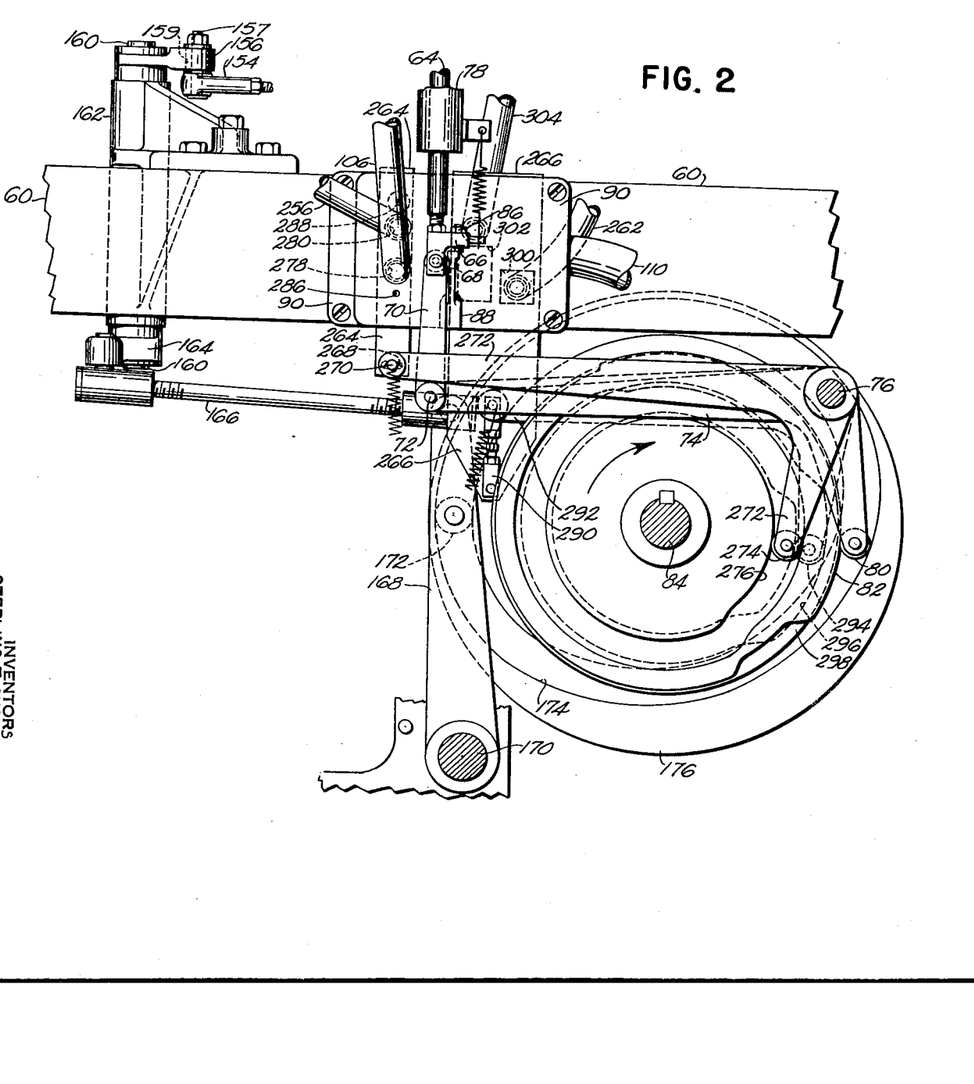
FIG. 2 is a side elevation of the driving and suction control mechanism of the binder web feeding apparatus.

The table 28 is secured to and carried by the upper end of a vertical shaft 64 whose lower end is secured to a lug 66 (FIGS. 1 and 2) which in turn is pivotally mounted to a stud 68 carried by the upper end of a link 70 whose lower end is pivotally connected to a stud 72 carried by the free end of a cam lever 74 loosely mounted on a shaft 76 as illustrated in FIG. 2. Vertical shaft 64 is guided and slidably supported by a hub 78 integral with the suction chamber 56. The cam lever 74 is of a bell crank design and carries a cam roller 80 engaging a cam 82 mounted on the main cam shaft 84 of the machine. The lug 66 carrying the suction table supporting shaft 64 is provided with an adjustable stop screw 86 coacting with a stop lug 88 projecting from a valve housing 90 secured to the bed plate 60 of the machine. It is self-evident that due to the cam action transmitted to the levers and links just mentioned the suction table 28 may be raised and lowered in the desired manner.

The suction table 28 is connected to the suction chamber 56 by means of a tube 92 secured to the bottom plate 36 of the suction table and slidingly projecting through the hole 94 into the suction chamber 56. To the bottom of suction chamber 56 is secured a suitable gasket or washer 96 employed for the purpose of preventing admittance of suction through the tube 92 into suction table 28 when the latter is in its lowermost position and the lower end of tube 92 contacts said gasket 96, as illustrated in FIG. 1. The top of suction table 28 is provided with suitable holes 98 through which suction is applied to the web after the latter is fed across said table.

The suction feed head 26 consists of a main pickup member 100 and a sectional pickup member 102 both of which are secured to a hollow trough-like supporting bracket 104 which through a suitable tube 106 is connected to a suction control box 108 which is permanently supplied with suction by means of duct 110 from a suitable source (not shown). The suction feed supporting bracket 104 by means of arms 112, 114 is loosely mounted on a horizontal shaft 116 secured to and carried at one end by a bracket 118 mounted on a reciprocating carriage 120 which in turn is slidingly supported by means of two vertically spaced horizontal shafts 122.

One of the shafts 122 is supported and rigidly mounted at one end in a bracket 124 while the other end of said shaft is suitably mounted in the frame bracket 56. The other shaft 22 is also mounted at one end in bracket 124 while the other end of the same is supported by means of a bracket 126 secured to the frame bracket 56. The arm 114 of the feed head supporting bracket 104 is locked to a lug 128 by means of a spring plunger 130 carried by said lug and engaging with a hole 132 of the hub of arm 114. The lug 128 is rigidly attached to the horizontal shaft 116 which at its free end carries a roller 134 which engages with a horizontal track 136 of a bracket 138 mounted to the said edge of the control box 56 thus providing additional support of the horizontal shaft 116. The arm 114 is provided with a second hole 140 which is used for engagement with the spring plunger 130 when a lifting of the feed head is desirable during threading of the web into the machine.

The shaft 116 also loosely supports two forked brackets 142 and 144 which carry cutting rollers 146 and 148, respectively. The cutting roller carrying brackets 142, 144 are yieldingly connected with suitable brackets 150 and 152, respectively, in a manner well known in the art to provide resiliency and sufficient pressure to the rollers to effect the desirable cutting action when passing over the knife 32 on the suction table 28.

The shaft 116 is horizontally reciprocated by means of the carriage 120 which through adjustable link 154 is connected to an arm 156 which is mounted on an oscillating vertical shaft 160 rotatably supported by a bearing bracket 162 secured to the bed plate 60 of the machine. Link 154 is secured to arm 156 by means of a stud 157 adjustably engaging with a suitable slot 159 in arm 156, thus providing means for varying the reciprocal horizontal feed movement of carriage 120 (FIGS. 1, 2 and 4). To vertical shaft 160 is also secured an arm 164 which engages with one ball joint end of a connecting rod 166 while the other end of said rod by means of another ball joint is connected to a cam lever 168 loosely mounted on a shaft 170 (FIG. 2) suitably supported by a bearing of the main frame portion of the machine. Cam lever 168 carries a cam roller 172 which engages with a cam track 174 of cam 176 mounted on the main cam shaft 84. Bracket 118 supports shaft 116 and also carries a horizontal gear rack 178 (FIG. 3) which engages with a gear 180 connected by a one-way clutch 252 to the horizontal shaft 182 supported by suitable bearings in the bracket 124.

To shaft 182 is scured the lower web feed roller 22 and also a gear 184 which meshes with a gear 186 mounted on a shaft 188 which supports the upper web feed roller 20. Thus reciprocation of carriage 120 carring bracket 118 provides an intermittent one-way feed drive for feed rollers 20 and 22. The shaft 188 at each end is provided with eccentric extensions 190 supported by vertically slidable bearings 192. One of the eccentric extensions 190 on shaft 188 is provided with a lever 194 by means of which the upper feed roller may be raised for web threading purposes. The spring 196 is provided to keep sufficient tension between the upper feed roller 20 and the lower feed roller 22 to effect proper feeding action during operation of the machine.

The reel R of the web W is supported by means of two conical flanges 198 and 200. Conical flange 198 is provided with a sleeve 202 (FIG. 4) rotatably supported on a stationary stud shaft 204 secured at one end to a suitable bracket 206 mounted on the bracket 124. The conical flange 200 is provided with a hub 208 detachable by means of thumb screw 210 secured to the sleeve 202 of conical flange 198. Integral with conical flange 198 is a disc 212 which is provided with an annular groove 214 which engages with a roller 216 pivotally secured to the free end of a threaded stud 218 held in a threaded hub 220 of the bracket 206. The threaded stud 218 is equipped with a knob 222 provided for the purpose of enabling one by turning said threaded stud to effect a lateral adjustment of the two conical flanges 198 and 200 and therewith the lateral adjustment of the reel R and web W.

To prevent overrunning of the reel R during the intermittent feed action applied upon the web the conical flange 198 is provided with an annular groove 224 which engages with a brake band 226 one end of which is anchored to the free end of a threaded stud 228 while the other end is secured to a sleeve 230 loosely supported on a shaft 232 rotatably held in suitable bearings of the bracket 124. The sleeve 230 engages with one end of a torsion spring 234 whose other end is anchored to a collar 236 secured to horizontal shaft 232 to provide resilient anchoring for the brake band 226. To shaft 232 is also secured an arm 238 the free end of which carries an idler roller 240 which engages with the web W. Arm 238 also carries a roller 242 which engages with the brake band 226. A trip lever 244 is mounted on shaft 232 to trip a suitable micro switch 246 in case web W should break or run out during operation.

Since micro switch 246 stops the entire machine when tripped, the machine is provided with a latch lever 248 which may be engaged with the roller carrying stud 250 during the initial start-up period of the machine when it is desired to keep the machine running without the feeding of web.

Figure 5:
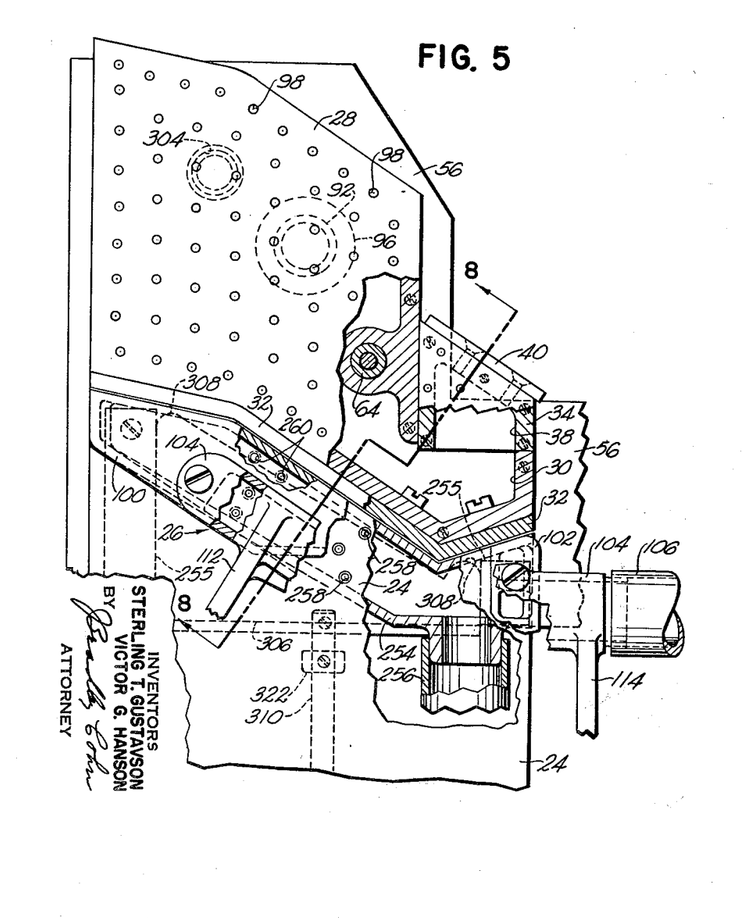
FIG. 5 is a detailed plan view, partly in section, of the web feed head in conjunction with the suction table cutting mechanism.
Figure 8:
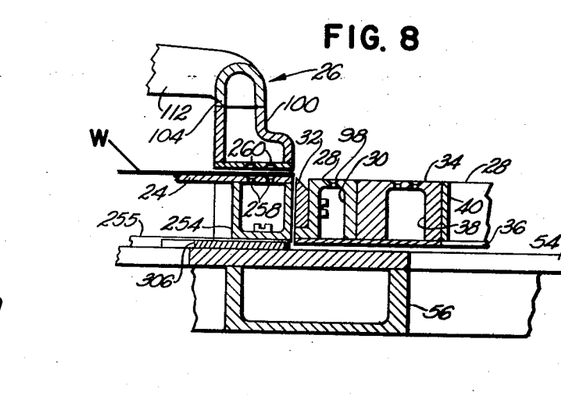
FIG. 8 is a partial sectional side elevation of the suction table and web feed head taken on line 8—8 of FIG. 5.
Figure 9:
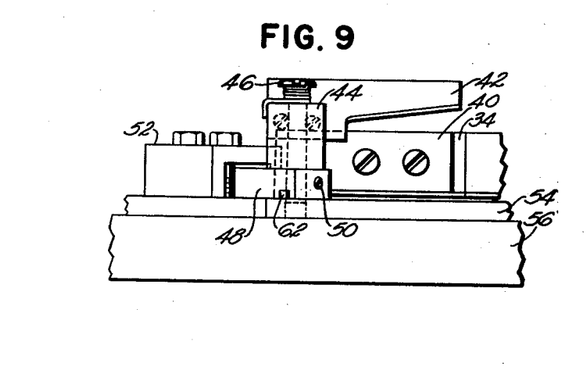
FIG. 9 is a partial end elevation of the suction table, taken on line 9—9 of FIG. 3, illustrating the ledger plate and trimming knife connected therewith.

As mentioned heretofore, the operation of the machine begins with placing the leading end of web W on the pickup table 24, the forward portion of which is supported by and mounted on a suction chamber 254, which in turn is supported by a pair of spaced guide bars 255 secured to the top plate 54 of the suction chamber 56. The suction chamber 254 by means of a suitable hose or duct 256 is connected to the valve housing 90 of the suction control box 108 while the end portion of the pickup table 24, which is over the suction chamber 254, is provided with a plurality of suitable suction holes 258 (FIGS. 5 and 8).

The undersides, i.e. the sides of the pickup member 100 and sectional pickup member 102 of the feed head 26, which face the pickup table 24, are also provided with suitably shaped suction holes 260. At the start the leading end of the web W is held onto the pickup table 24 by means of suction applied to the chamber 254 and holes 258 through the table 24 as illustrated in FIG. 8. The suction supply to chamber 254 is then stopped and suction is supplied to the pickup member and sectional pickup members 100 and 102, respectively, of the feed head 26, which through holes 260 will suctionally pick up the leading end of web W from the suction table 24. The feed head 26 then moves forward and carries the leading end of the web W over the suction table 28 while the latter is in its lowermost position where it can have no suction because of the closure of tube 92 by gasket 96. As described heretofore, the forward movement of feed head 26 causes some web W to be fed from reel R by the rollers 20 and 22 through the gear rack 178 connected to the feed head supporting structure. At the end of the feed stroke, suction table 28 rises slightly and suction is applied through tube 92 from the chamber 56 to holes 98 to draw on the end of the web W over table 28. At the same time suction is cut off from the feed head 26 at control box 90.

Web W is then firmly held on the top surface of the suction table 28 while the feed head 26 starts on its return stroke without feed action upon the web due to the uni-directional clutch 252 on shaft 182 of roller 22. The spring mounted cutting rollers 146 and 148 which cleared knife 32 during the forward movement of head 26 now contact the cutting edge of knife 32 because of the slightly raised position of table 28 and cut the web at this point.

The now severed leading piece of web held on table 28 constitutes the binder B (FIG. 6) for the cigar while the new leading end of the rest of the web is again held by suction from the chamber 254 through the holes 258 in the pickup table 24. The suction control, as will be described hereinafter, is so arranged that when the suction supply to the pickup members 100 and 102 of the feed head 26 is shut off, the suction supply to the chamber 254 beneath the pickup table 24 is opened. Therefore, when the suction supply to the feed head 26 was shut off at the end of its forward stroke, the suction supply to chamber 254 was opened so that even before cutting the entire end of the web was rigidly held by the suction table 28 and the chamber 254 of table 24.

After the binder B has been cut from the web W by the cutting rollers 146 and 148 and the latter together with the feed head 26 have returned to their normal starting position, the binder carrying suction table 28 through cam lever 74 and cam 82 is raised an additional distance to meet the then dwelling binder transfer arm T (FIG. 1) which picks up the binder B from the suction table 28 as the suction supply to the latter is shut off while at the same moment suction is supplied to the transfer arm T through a suitable tube 262 connected to the suction control box.

Figure 6:
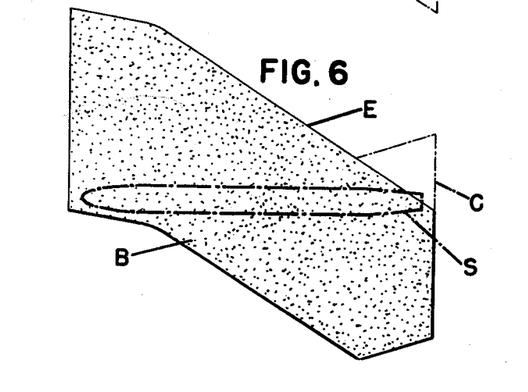
FIG. 6 is a plan view of a binder after being cut from the web and trimmed, the length of the cigar to be made determining the width of the web.

Referring to FIG. 6, it will be noted that the shape of knife 32 establishes the shape of the binder except for the small projecting tab C shown in dot and dash lines. Tab C is removed by the hinge mounted knife 42 in conjunction with the ledgerplate 40 on the section 34 of the table 28 as the table 28 moves upwardly to meet the binder transfer arm T. Therefore, the binder B before reaching and contacting the transfer arm T has the desirable smooth forward edge E as illustrated in FIG. 6. This arrangement provides less web material loss than the double tab removal such as shown in the co-pending application of Henry H. Wheeler, Serial No. 506,129 filed May 5, 1955 and now Patent No. 2,846,010, where the width of the web is related to cigar diameter rather than as here (FIG. 6) cigar length. Further, this arrangement eliminates the undesirable necessity of modelling the entire suction head 28 when a binder of greater width must be produced to accommodate a cigar of larger diameter. The distance of the feed stroke is, of course, correlated to the diameter or the circumference of the cigar. It is generally about two and one-half times the diameter depending on the amount of overlap desired. The only change necessary is an increased feed stroke for the feed head 26 and a replacement of the end section 34 by a larger one. The hinged knife 42 may be moved to engage with the ledger plate of the larger end section 34. This is done simply by loosening the clamp lug 52 and sliding the horizontal knife assembly supporting bar 48 to the appropriate position. To ready the machine for a shorter or longer cigar, the only requirement is the use of a reel or web the width of which corresponds with the length of the cigar to be made.

It is thus of important significance that the width of the web W is established by the length of the cigar S as indicated in dot and dash lines in FIG. 6 instead of the width of the web being correlated to the diameter of the cigar as heretofore. This results in both the saving of material and the elimination of modelling for such expensive parts as the table 28.

Figure 7:
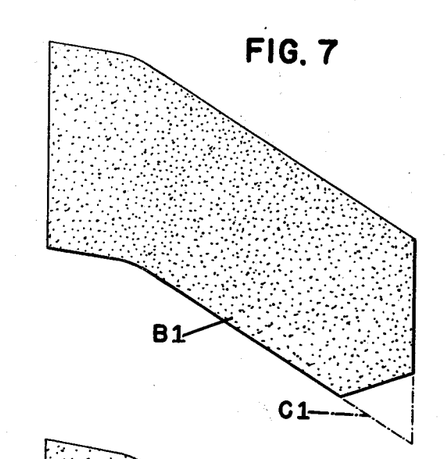
FIG. 7 is a plan view of a binder made by a web feed method in which the cutting and trimming is accomplished at the same time.

FIG. 7 illustrates a binder B1 made by a modified method where the projecting tab C1 is cut off the leading end of the web before the latter is fed across the suction table.

Figure 10:
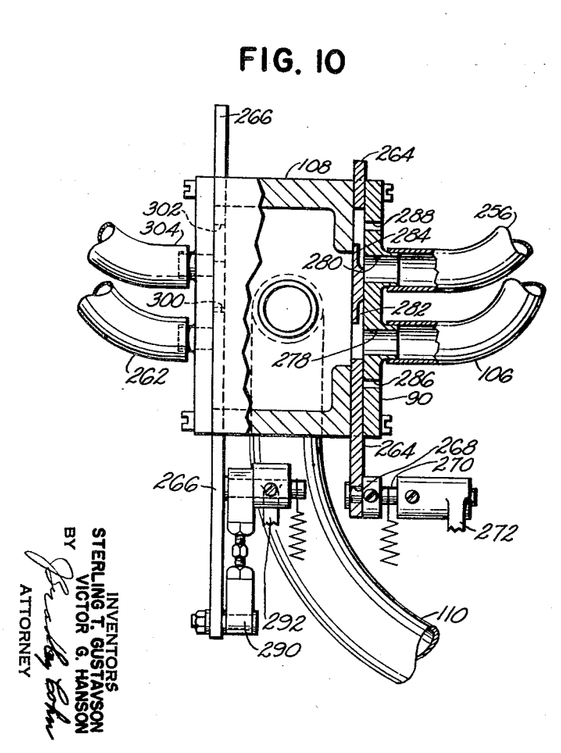
FIG. 10 is an end elevation partly in section, of the suction control box in conjunction with its slide valves.

All suction supplied to the binder feeding apparatus illustrated is funneled from a suitable source of suction (not shown) through a suitable tube or duct 110 to the suction control box 108. The latter is provided with two vertically slidable gate valves 264 and 266 employed for the purpose of controlling the flow of the suction to the various components mentioned heretofore. Gate valve 264 by means of a slot 268 (FIG. 2) engages with a pin or stud 270 carried by and projecting from the free end of a bell crank shaped cam lever 272 to which is pivotally mounted a cam roller 274 engaging with a cam track 276 provided in cam 82 secured to the main cam shaft 84. Cam lever 272 provides properly timed vertical reciprocating motion to the gate valve 264 affecting a simultaneously opening and closing, and vice versa, of the ports 278 and 280 in the valve housing 90 of the control box 108 (FIG. 10). Port 278 through the tube or duct 106 is connected to the feed head supporting bracket 104 and is employed to supply suction to the feed head 26. Port 280 through the duct or tube 256 is connected to the suction chamber 254 of the pickup table 24 and supplies suction to the same as described heretofore. Gate valve 264 is also provided with a pair of suitable grooves 282 and 284 which work in conjunction with a pair of vent holes 286 and 288, respectively, provided for the purpose of bleeding the suction out of ducts 106 and 256, respectively, after the ports 278 and 280, respectively, are closed and the suction supply is shut off, thus preventing adherence of the web W to the feed head 26 or the pickup table 24 after the suction supply to these components is stopped. The gate valve 266 through an adjustable link 290 is connected to the free end of a bell crank shaped cam lever 292 carrying a cam roller 294 engaging with a track 296 of a cam 298 mounted on the main cam shaft 84. Cam 298 through lever 292 provides properly timed vertical reciprocating motion to the gate valve 266 to effect the control of the suction supply to the suction table 28 and binder transfer arm T. The gate valve 266 is provided with ports 300 and 302. The latter is designed to control the flow of suction through the duct or tube 304 to the chamber 56 which in turn supplied suction to the suction table 28, while the port 300 is employed to control the flow of suction through duct or tube 262 to the binder transfer arm T.

Figure 3:
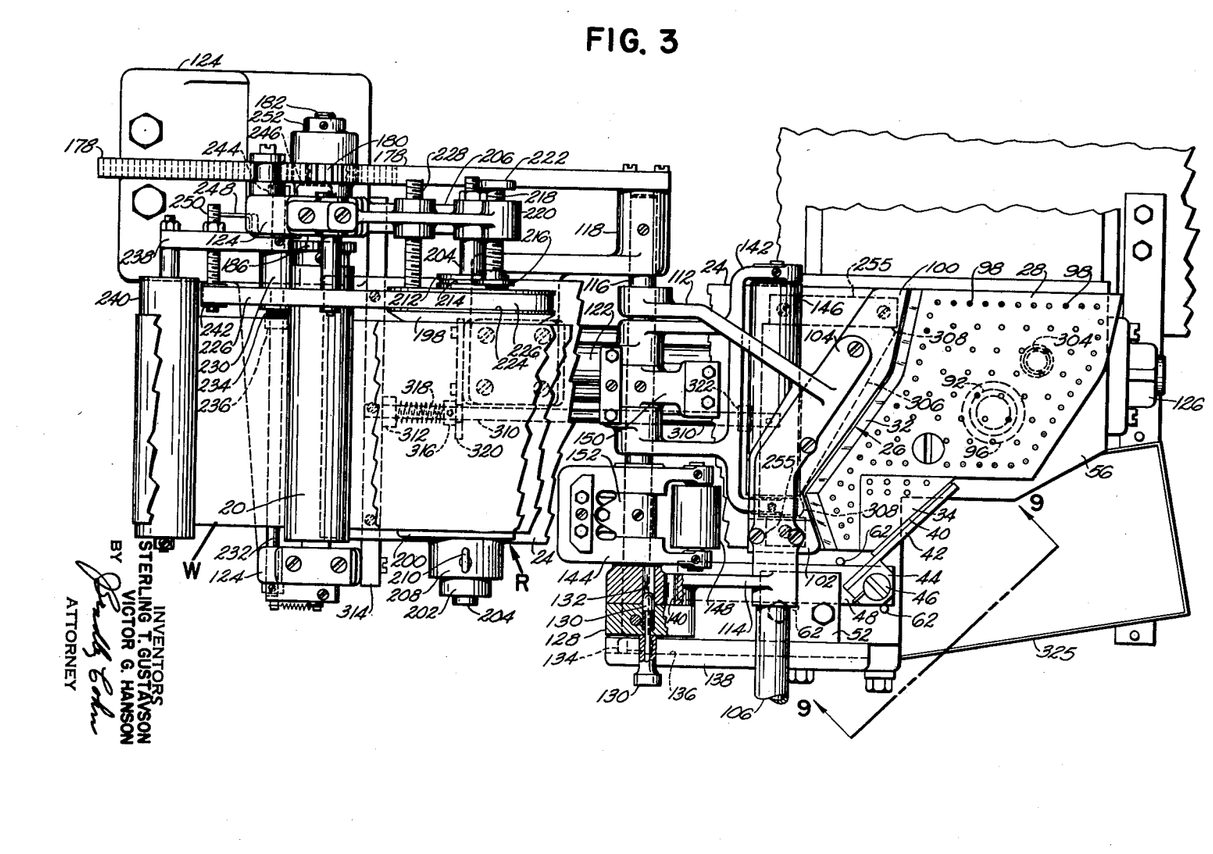
FIG. 3 is a plan view of the binder web feeding apparatus.
Figure 4:
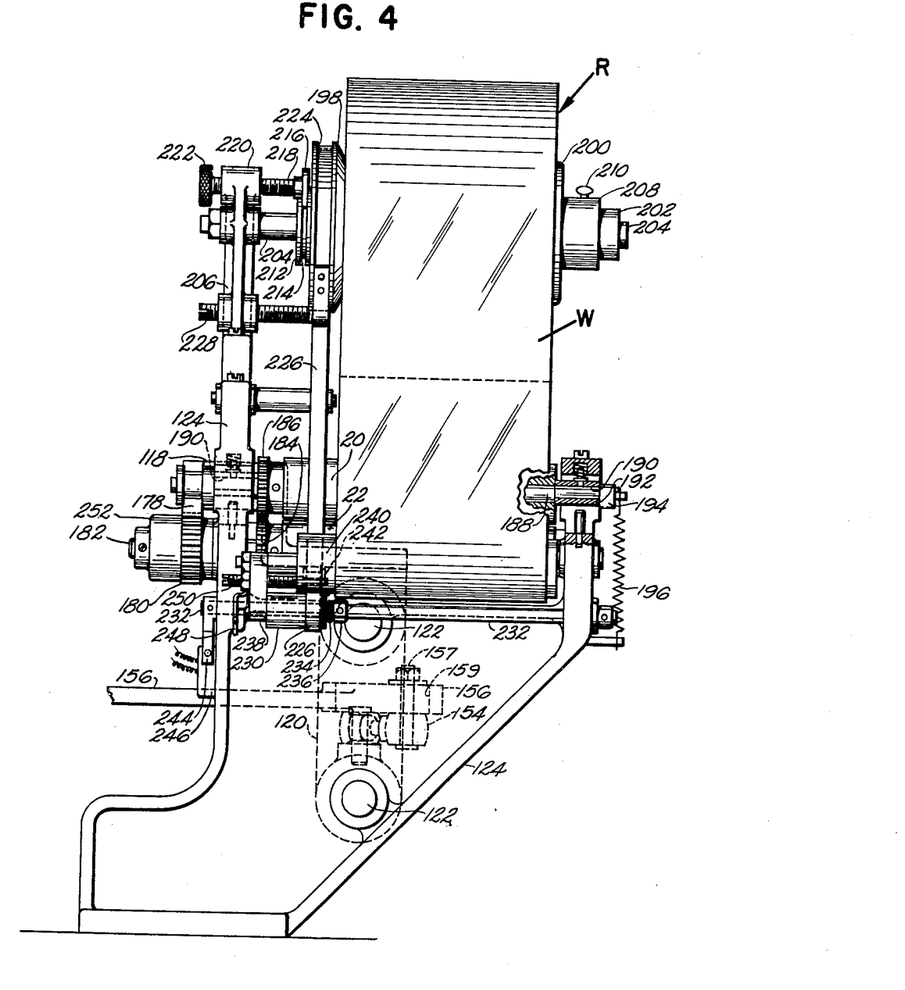
FIG. 4 is an end elevation of the same, taken on line 4—4 of FIG. 1.

In order to provide a solid support for the knife 32 during engagement by the cutting rollers 146 and 148, the machine is provided with a horizontally slidable support plate 306 slidingly supported by the top surface of suction chamber 56 between the side guide bars 255 (FIG. 3). The leading front edge of plate 306 is somewhat angular and has two leading projections 308, while the center portion of the rear edge of said plate is attached to one end of a horizontal rod 310. The other end of said rod 310 is slidably supported by a lug 312 (FIGS. 1 and 3) secured to a transverse bar 314 held by the bracket 124. To rod 310 is also secured a collar 316 and a compression spring 318 surrounding said rod and confined between said collar 316 and the lug 312 is provided. Also slidingly and loosely engaging with rod 310 is a lug or plate 320 which in turn is secured to the reciprocating carriage 120 (FIG. 1). Adjacent or a short distance from that end of the horizontal rod 310 to which is secured the plate 306 is secured another collar 322.

The knife supporting plate 306 operates as follows: When the carriage 120 is in normal or backmost position as shown in FIG. 1, the plate 320 engages with the collar 316 and effects a compression of the spring 318 which is confined between said collars 316 and the bearing lug 312 of the rod 310. As soon as the carriage moves forward the collar 316 and rod 310 due to the tendency of spring 318 is urged to move forward also. However, since during the forward or feed stroke of the feed head carrying carriage 120 the suction table 28 remains in its lowermost position the rod 310 and plate 306, after a short forward movement, are arrested as the leading projection 308 contacts the lower front edge of the suction table 28. When, as described heretofore, the suction table 28 moves slightly upward to effect a cutting of the web W during the backward or cutting stroke of the carriage, said upward movement of the suction table 28 is sufficient to permit plate 306, due to the urgency of the compression spring 318, to slide beneath the front edge of the knife supporting portion of the suction table 28, so that when the spring mounted cutting rollers 146 and 148 pass over the knife 32, the latter is rigidly supported to assure a positive and clean cut of the web W.

Since for aligning purposes it is desirable that only two leading projections 308 of plate 306 act as support of the knife during cutting action the collar 322 is so secured to rod 310 that it acts as a stopping and arresting means for plate 306 when it contacts the top front edge of the suction chamber 56. During the continued backward stroke of the carriage 120 the plate 320, of course, engages again with the collar 316 causing the rod 310 and plate 306 to move backward with the carriage to the normal retracted starting position.

To prevent the waste tabs C, cut from the binder B by the hinge mounted knife 42, from falling into the machine, a waste receptacle 325 (FIG. 3) is provided. The latter is suitably and removably suspended from the main frame of the machine.

As used in these specifications and in the appended claims, unless a contrary intent is clearly indicated, the words "wrapper" and "binder" are intended to be interchangeable and each to include the other since obviously the same methods and/or means could be used, if desired, to form a wrapper and for a binder (as these terms are more strictly used in the art) and moreover certain cigars, as for example the type known as Toscani, have only one leaf or web covering which can be variously referred to as the wrapper or the binder since it performs the functions of both.

We claim:

1. The method of forming tobacco binders for cigars having at least one reduced end from a continuous web source comprising selecting a web source having a width substantially equal to the length of a cigar to be wrapped, advancing a portion of said web source a distance shorter than said web width and correlated to the diameter of said cigar, making a single irregular substantially transverse severance of said web to separate said advanced portion and reducing said portion in the region which is to cover said reduced end of the cigar by removing a single small tab therefrom.

2. The method of reducing waste material in severing a cigar covering from a continuous web having a first pair of opposed rectilinear parallel edges, said method comprising selecting a web of a width approximating the length of a cigar to be covered and severing a portion from said web having a linear dimension shorter than said width and correlated to the diameter of a cigar, said linear dimension being a selected multiple at least twice the diameter of the cigar, said portion having a first pair of opposed rectilinear parallel sides conterminous with said edges and a second pair of opposed substantially parallel sides formed by a first and a second identical severance, in sequence, substantially transverse said edges, and removing a single small triangular segment from said portion in an area included between a portion of one of said rectilinear sides and one of said sides formed by one of said severances, to reduce the amount of web that will be applied to one end of said cigar.

3. A article of manufacture formed by the method set forth in claim 2.

4. An article of manufacture for covering a cigar comprising a portion of web tobacco material having one linear dimension substantially equivalent to the length of a cigar, being bounded at each end of said dimension by an individual one of two parallel rectilinear edges of a tobacco web and having a second dimension transverse to said first-named dimension, shorter than said first dimension, and being correlated to the diameter of a cigar and being bounded at each end by an individual one of two substantially identical irregular parallel edges forming said article, and further characterized in that one of said irregular parallel edges differs from the other of said irregular parallel edges by a small sector like segment or tab.

5. The method of making cigar wrappers or binders, said binders from a continuous web of tobacco material, said binders or wrappers having an opposed pair of parallel rectilinear edges conterminous with rectilinear edges of said web, which method consists in the following steps in the described order: (1) selecting a web having a width substantially equal to the length of a cigar to be enclosed therein; (2) severing the leading end of said web by means of an irregular cut completely traversing said web from edge to edge thereof, to completely form the rear boudary on a first wrapper or binder, and to form substantially the entire front boundary of a second binder or wrapper; (3) substantially simultaneously with the severing described in step (2), severing said single small section from the front boundary of said first wrapper or binder to complete its formation and to reduce the tobacco web material which is to enclose a shaped end of a cigar; (4) transporting said first wrapper or binder to another station; and (5) longitudinally advancing said web after said complete severing into position to permit the formation of the rear boundary and the modification of the front boundary of said second wrapper or binder.

6. The method of forming binders for cigars from a web source, said binders having two opposed pairs of substantailly parallel sides slightly modified at one corner only, said method comprising the following steps:
   (1) Selecting a web of a width substantially equal to the length of a cigar to be enwrapped therein;
   (2) Completely severing a leading end transversely of said web, to form a first preliminary contoured end of a first binder;
   (3) Linearly advancing said leading end a distance shorter than said web width and correlated to the diameter of said cigar;
   (4) Removing a small tab from said leading end to complete said first contoured end of said first binder;
   (5) Completely severing said linearly advanced end of said web transversely of said web to form a complete second contoured end of said first binder and a first preliminary contoured end of a second binder.

7. The wide-web, knife-severance method of forming a binder, for a cigar having at least one reduced end, from a wide tobacco web having opposed parallel rectilinear edges spaced substantially equal to the length of a cigar to be enclosed therein, to save tobacco web material, and to obviate the expense of a die, which method comprises: (1) advancing said wide web a predetermined distance, shorter than said web width, and correlated to the diameter of said cigar; (2) making two identical irregular, substantailly parallel, transverse knife-severances completely across said wide web, to sever said binder from said web; and (3) making a second single shorter, rectilinear, knife-severance, to remove a single small triangular tab, to reduce the binder in the region which is to enwrap said reduced end of said cigar.

8. In the machine manufacture of binders, or wrappers, for cigars, the method of operation which comprises: (1) selecting a web of tobacco material having a pair of substantially parallel rectilinear edges, and having a width substantially equal to the length of a cigar bunch, or cigar, to be enwrapped in a binder, or wrapper, formed therefrom; and (2) making two spaced substantially parallel severances, completely across said web, between said edges, said severances separated a distance shorter than said length, and so directed as to permit the enwinding of said bunch, or cigar, in at least two partially superposed layers of said material wound helically between said rectilinear edges, along the length of said bunch, or cigar.

9. In the machine manufacture of binders, or wrappers, for cigars having reduced tuck ends, the method of operation which comprises: (1) selecting a web of tobacco material having a pair of substantially parallel rectilinear edges, and having a width substantially equal to the length of a cigar bunch, or cigar, to be enwrapped in a binder, or wrapper, formed; (2) making two spaced substantially parallel severances, completely across said web, between said edges, said severances separated a distance shorter than said length, and so directed as to permit the enwinding of said bunch, or cigar, in at least two partially superposed layers of said material wound helically between said rectilinear edges, along the length of said bunch, or cigar; and (3) reducing the binder, or wrapper, in the region which is to enclose the tuck end of the cigar.

References Cited in the file of this patent

UNITED STATES PATENTS

| | | |
|---|---|---|
| 657,403 | Du Brul | Sept. 4, 1900 |
| 1,257,815 | Courtinade | Feb. 26, 1918 |
| 1,601,127 | McFarland | Sept. 28, 1926 |
| 1,831,374 | Topping | Nov. 10, 1931 |
| 2,316,784 | Gladeck | Apr. 20, 1943 |
| 2,846,010 | Wheeler | Aug. 5, 1958 |